United States Patent
Josdal

(10) Patent No.: US 6,618,894 B2
(45) Date of Patent: Sep. 16, 2003

(54) SCRAPING TOOL

(75) Inventor: Johan Josdal, Bandhagen (SE)

(73) Assignee: Novus Innovation Inc., Phoenix, AZ (US)

( * ) Notice: Subject to any disclaimer, the term of this patent is extended or adjusted under 35 U.S.C. 154(b) by 0 days.

(21) Appl. No.: 10/123,839

(22) Filed: Apr. 15, 2002

(65) Prior Publication Data

US 2002/0166191 A1 Nov. 14, 2002

(51) Int. Cl.⁷ .............................................. A47L 13/08
(52) U.S. Cl. .................. 15/236.06; 15/236.01; 30/172
(58) Field of Search .................... 15/236.01, 236.02, 15/236.05, 236.06, 236.08, 236.09; 30/172

(56) References Cited

U.S. PATENT DOCUMENTS

| | | | | |
|---|---|---|---|---|
| 1,517,762 A | * | 12/1924 | De Keller Stamey | |
| 3,408,677 A | * | 11/1968 | Yates | |
| 5,857,237 A | * | 1/1999 | Dranginis | |
| 6,210,490 B1 | * | 4/2001 | Michael et al. | |
| 6,223,801 B1 | * | 5/2001 | Mitchell | |

* cited by examiner

Primary Examiner—Randall E. Chin
(74) Attorney, Agent, or Firm—Rolf Fasth; Fasth Law Offices

(57) ABSTRACT

The invention relates to a scraping tool for removal of a coating on a surface. The tool has a plate with a first scraping edge that is a straight outer edge of the plate. The plate has an inner part with a slit defined therein to form a tongue-like element. The element has a straight edge and is bendable when in use. The edge is a second scraping edge that may bear against the surface substantially parallel to the first scraping edge for simultaneous scraping of the surface. This provides a more powerful scraping effect.

7 Claims, 1 Drawing Sheet

SCRAPING TOOL

PRIOR APPLICATIONS

This application is a U.S. application which claims priority from Swedish Application No. 0101649-2, filed May 10, 2001.

TECHNICAL FIELD

The present invention relates to a scraping tool for removing a coating on a surface. The tool includes a plate with a first scraping edge that is a straight outer edge of the plate.

BACKGROUND OF THE INVENTION

When scraping off snow and ice layers from car windshields during the winter, it is common to use a hand-held scraping tool that has a scraping edge used to scrape away both snow and ice. Such a scraping tool can include a plate where one or many outer edges function as scraping edges. Some of the different scraping edges have different sharpness. The drawback of the previously known scraping tools is that they require much effort and time to effectively remove both snow and ice from the windshield and the remaining windows of the car. It is therefore common to first scrape off the snow from all the windows and then scrape off the ice by using more pressure or a sharper edge to be able to remove the ice.

SUMMARY OF THE INVENTION

One object of the present invention is therefore to provide an improved scraping tool to, for example, be able to remove both snow and ice from windshield with only one scraping.

The present invention provides a scraping tool that achieves the above outlined object. The scraping tool include a plate made of plastic or metal. It is preferably shaped like a credit card so that it can easily be stored in a wallet. The plate has a first scraping edge that is a straight outer edge of the plate. The distinguishing features of the present invention are detailed in the subsequent claims.

Thanks to this invention, a scraping tool is provided that, in an excellent way, achieves the above-outlined object. The scraping tool of the present invention is a plate made from plastic or metal. It is preferably shaped in a credit card format so that it can easily fit into a wallet. The plate has a first scraping edge that is a straight outer edge of the plate. The plate has an inner part with a slit defined therein to form a tongue-like element. The element has a straight edge and is bendable when in use. The edge is a second scraping edge that is substantially parallel to the first scraping edge. When the scraping tool is not in use it is thus plate shaped and easy to handle and takes up little space. When it is used, the second scraping edge is bent so that the two substantially parallel scraping edges simultaneously bear against the surface. When a scraping movement is made, the two scraping edges scrape the surface one after the another. In this way, an enhanced scraping effect is achieved that makes it possible to, for example, remove both snow and ice layers with one scraping movement.

According to a preferred embodiment of the invention, an even more effective scraping may be achieved by making the second bendable scraping edge sharper than the first scraping edge. It could be made sharper than conventional scraping tools since conventional tools are prone to injuring the user when the scraping edges are the outer edges of the plate. When removing snow and ice layers from car windshields the first edge removes the snow and the subsequent sharper scraping edge removes the ice layer.

To make the outwardly bending easier of the tongue-like element and to avoid cracking at the end points of the slit, substantially circular openings may be arranged that compensate for any tension.

To make the scraping tool visible in the dark, a portion of the plate may be provided with a reflective surface and even a space for advertisements. The reflective surface makes it possible to use the tool as a conventional reflector because it may be attached to clothes and strollers with the tongue-like element.

As an extra safety feature, the four corners of the plate may be rounded to avoid cutting injuries.

The plate may also be provided with a hole for a key ring and with a magnet to make the scraping tool attachable to a metal surface such as a car or a refrigerator.

The present invention is not limited to be used as an ice scraper. Instead it may be used to remove different types of coatings from different types of surfaces such as wax, paint, frying layers and insects.

BRIEF DESCRIPTION OF THE DRAWINGS

The invention is described in more detail below with the help of a preferred embodiment and with reference to the attached drawings of which.

DETAILED DESCRIPTION OF A PREFERRED EMBODIMENT

Figure 1:
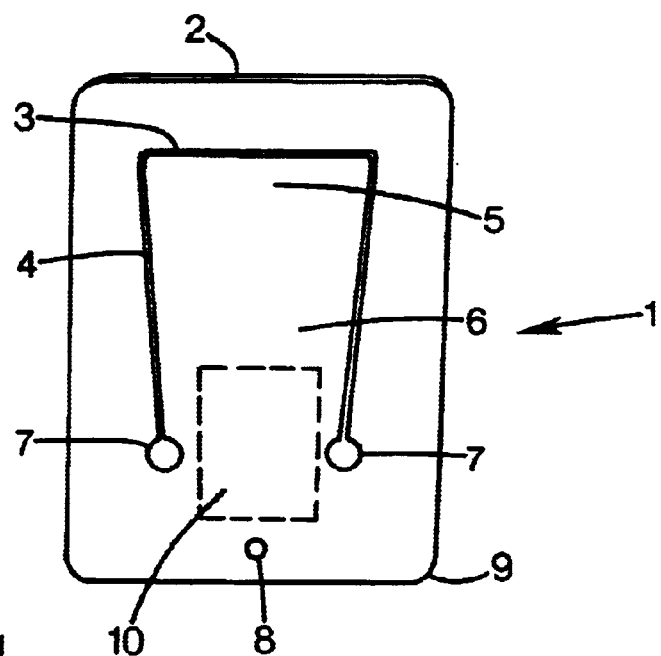
FIG. 1 shows a scraping tool from above when it is not in use and the tongue-like element with the second scraping edge is not bent outwardly.

With reference to FIG. 1, a rectangular plate shaped scraping tool 1 is shown. The tool 1 has a first scraping edge 2 that is the outer edge of one of the short sides of the plate. An inner surface of the plate is a slit 4 so that a tongue-like element 5 is formed. The element 5 is bendable when used and has a straight edge that constitutes a second scraping edge 3. The edge 3 is substantially parallel to the first scraping edge 2. When using the scraping tool both scraping edges may bear against the surface at the same time and scrape the surface one after another to achieve a powerful scraping effect. By making the second bendable scraping edge sharper than the first a further enhanced scraping effect is provided.

In the illustrated example, the surface of the plate is provided with a reflective surface 6 to be visible in the dark. The surface 6 may also have a surface for advertisements.

To make it easier to bend out the tongue-like element and to reduce the risk of cracks, the end points of the slits have substantially circular and tension compensating openings 7.

The plate also has a hole 8 in which a key ring may be attached.

In the illustrated example, the corner 9 of the plate is rounded for improved safety.

The underside of the plate has a magnet 10 so that the scraping tool may easily be attached to a metal surface such as on a refrigerator or a car.

FIG. 1 show the plate shaped rectangular scraping tool 1 when the tongue-like element 5 is not outwardly bent and the tool is not in use. The illustrated example that is shown in the figures is dimensioned in a credit card format and is thus small and handy and can be kept in a wallet. In the illustrated example, the first scraping edge 2 is the outer edge of one of the short sides of the plate. The inner surface of the plate is a slit 4 to form a tongue-like element 5 that has a straight edge that constitutes a second scraping edge 3. The edge 3 is substantially parallel to the first scraping edge 2. The second scraping edge may be made sharper than the first scraping edge.

Figure 2:
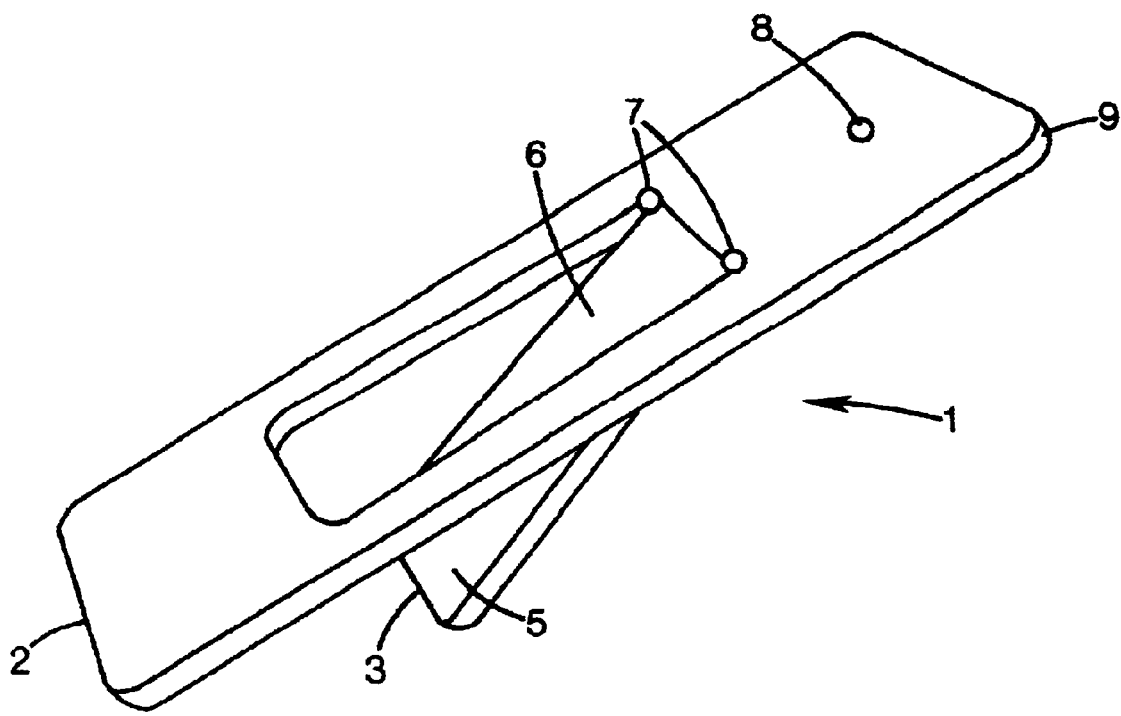
FIG. 2 shows a perspective view of a scraping tool when it is in use with the tongue-like element outwardly bent so that both scraping edges can bear against the surface for simultaneous scraping.

FIG. 2 shows the plate shaped rectangular scraping tool 1 as it may look when the tool is used so that the tongue-like element 5, that has a straight edge that constitutes a second scraping edge 3, is outwardly bent. The second scraping edge may bear against a surface and be substantially parallel to the first scraping edge 2 that is one of the short side 5 of the plate in the illustrated example.

What is claimed is:

1. A scraping tool for removal of a cover on a surface, comprising a plate having a first scraping edge, the edge being a straight outer edge of the plate, the plate having an inner part having an inner slit defined therein for forming a tongue-like element, the element having a straight edge and being bendable when in use, the straight edge being a second scraping edge that is bearable against the surface and being substantially parallel to the first scraping edge for simultaneous scraping of the surface.

2. The scraping tool according to claim 1 wherein the second scraping edge is sharper than the first scraping edge to achieve a more powerful scraping effect.

3. The scraping tool according to claim 1 wherein a surface of the plate is coated with a reflective surface.

4. The scraping tool according to claim 1 wherein end points of the slit have circular pressure compensating openings arranged to make an outward bending of the tongue-like element easier.

5. The scraping tool according to claim 1 wherein the plate has a substantially circular opening defined therein in which, for example, a key ring is attachable.

6. The scraping tool according to claim 1 wherein the plate has a rounded corner.

7. The scraping tool according to claim 1 wherein the tool has a magnet for attachment to metal surfaces such as car or refrigerator.

* * * * *